Feb. 23, 1965  W. A. MATHESON ETAL  3,170,565
BALE DIVERTER
Filed Jan. 24, 1963  2 Sheets-Sheet 1
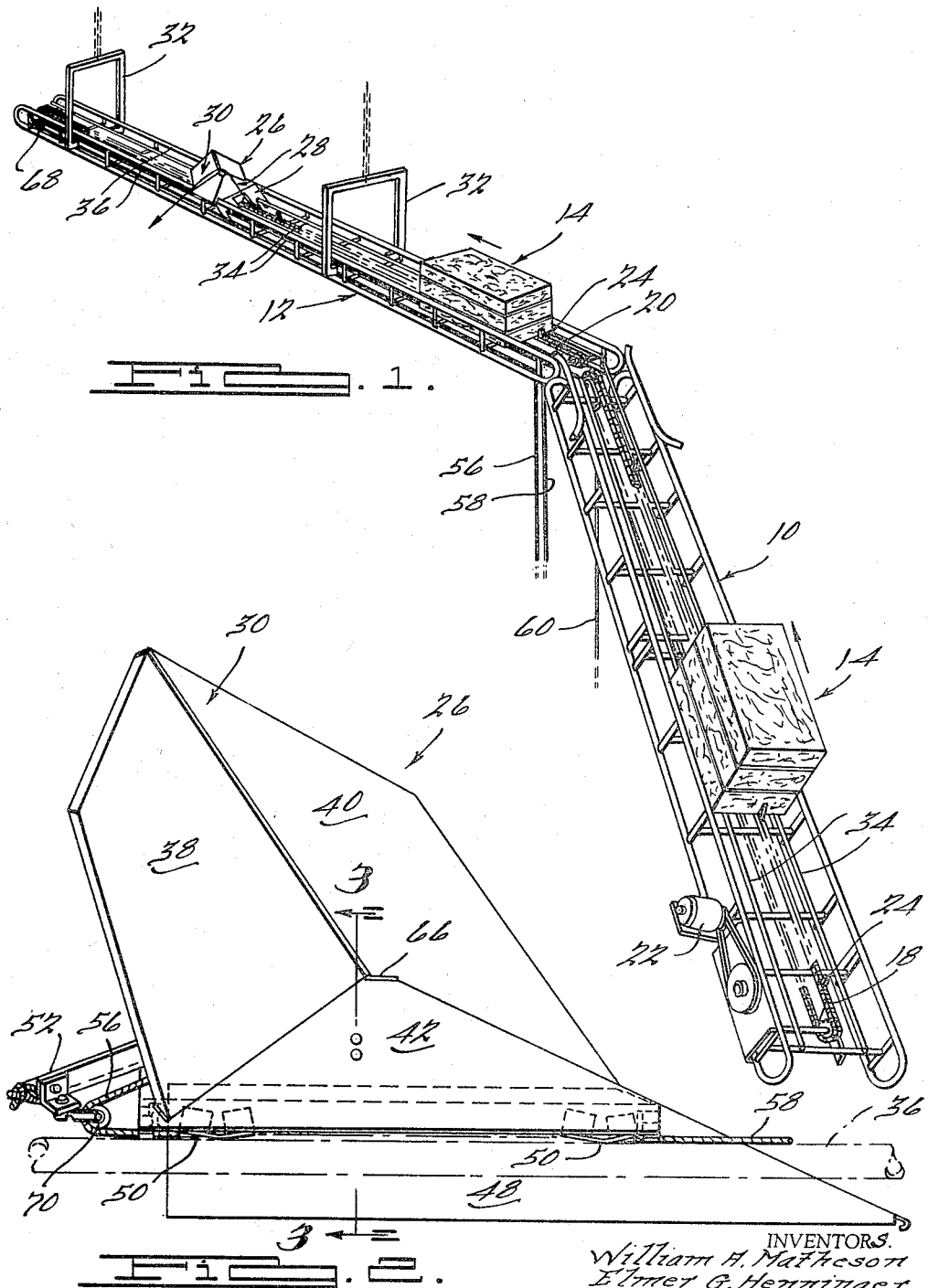
INVENTORS.
William A. Matheson
Elmer G. Henninger
BY Balluff and McKinley
ATTORNEYS.

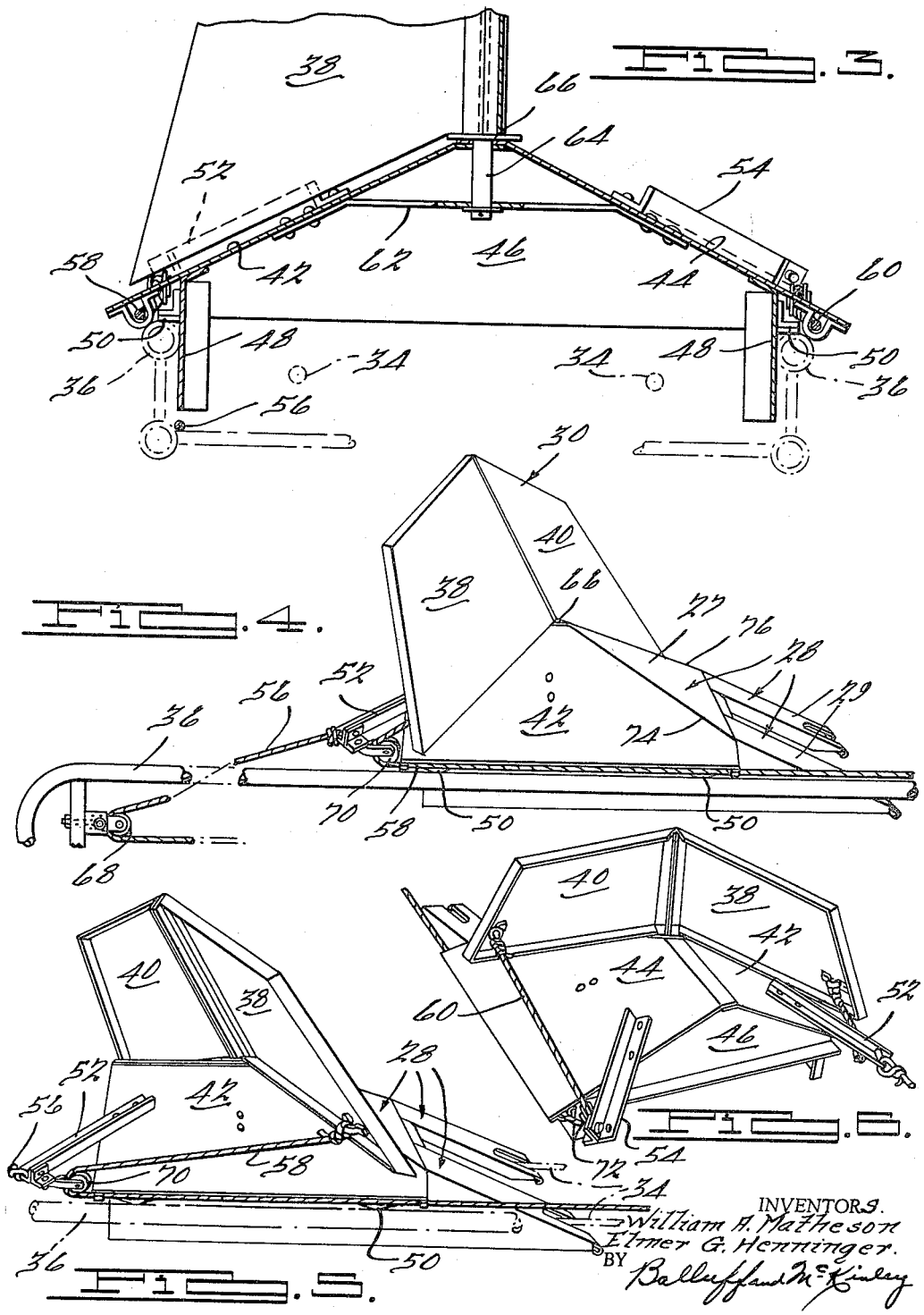

United States Patent Office 3,170,565
Patented Feb. 23, 1965

3,170,565
BALE DIVERTER
William A. Matheson and Elmer G. Henninger, Bloomington, Ill., assignors to Portable Elevator Mfg. Co., Bloomington, Ill., a corporation of Illinois
Filed Jan. 24, 1963, Ser. No. 253,667
6 Claims. (Cl. 198—185)

This invention relates to a bale diverter which is particularly useful in modern bale handling systems whereby bales are moved from one location to another by a power-driven conveyor. The diverter is movably mounted on the conveyor and is readily adjustable to deflect bales of various sizes to either side of the conveyor.

The principal object of this invention is to provide a new and improved bale or package diverter.

Another object of this invention is to provide a bale diverter which diverts a variety of sizes of bales to either side of a conveyor with equal facility.

Other and further objects of the invention will be apparent from the following description and claims and may be understood by reference to the accompanying drawings, of which there are two sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

FIGURE 1 is a view of a bale handling system utilizing the diverter;

FIGURE 2 is a side view of the diverter with the deflecting wing in position to divert the bales to the right of the diverter;

FIGURE 3 is a sectional view taken along line 3—3 of FIGURE 2;

FIGURE 4 is a perspective view of the diverter showing the wing in position to divert bales to the right;

FIGURE 5 is the same as FIGURE 4 but with the wing in position to divert bales to the left; and FIGURE 6 is a perspective view of the back of the diverter with the wing in position to divert bales to the right.

As illustrated at FIGURE 1, a bale handling system utilizing our invention comprises in general a series of bale conveyors 10 and 12 which move bales 14 along their length by means of endless chains 18 and 20 powered by an electric motor 22. Teeth or hooks 24 on chains 18 and 20 engage the bales and slide them along the guide bars 34 in the direction indicated by the arrows toward diverter 26. The bales ride up the front surface 28 of the diverter and against the wing or plate 30 which deflects the bales off of the diverter and away from the conveyor, as indicated by the arrow in FIGURE 1. Wing 30 is rotatably adjustable to divert bales to either side of the conveyor. The diverter is movably mounted on side rails 36 so that it may be moved to any location along conveyor 12 by means of ropes 56, 58 and 60.

The bale handling system described is particularly useful in moving bales from ground level to storage mows in a barn. Conveyor 10 carries the bales from the ground to the top of the barn where conveyor 12 supported by hangers 32 runs the length of the mow. By periodically moving diverter 26 along the conveyor 12 and by adjusting wing 30 to deflect bales to each side of the conveyor, the entire mow may be efficiently filled with bales.

As shown in FIGURES 2 through 6, the diverter 26 comprises in general an integral sheet metal base with a rotatable wing or plate 30 mounted on the top thereof. A rope control system is provided to move the diverter along the conveyor and to adjust the wing.

The base is mounted between side rails 36 by means of four slide supports 50 which rest on the top of the rails. The supports 50 are welded to side walls or guides 48 located immediately adjacent rails 36. At the back of the base, rear wall 46 connects the side walls 48 and forms a support for the sloping side surfaces 42 and 44. These surfaces extend over rails 36 and slope upwardly therefrom, intersecting above the conveyor.

Front surface 28 slopes upwardly from the conveyor bed and meets side surfaces 42 and 44 at edges or intersections 74 and 76, respectively. Intersections 74 and 76 meet at peak 66. As shown in FIGURE 4, front surface 28 comprises three parts, the main surface 27 located between side surfaces 42 and 44, and two continuations 29 which extend downwardly from 27 and around guide bars 34. The space between the continuations 29 is left open to allow room for chain 20 with teeth 24 to move freely below the base. Support member or bracket 62 is attached between the side surfaces 42 and 44 and is located below peak 66.

Wing 30 comprises right and left deflecting arms 38 and 40 which are attached to vertical rod 64. The arms 38 and 40 are generally canted or slope away from the front of the conveyor at an angle more nearly vertical than that of the front surface 28. The arms also intersect at a slight angle to form a shallow V pointing generally toward the front of the diverter. This geometry is preferred, but is not necessary to the operation of the diverter.

Wing 30 is mounted on the base by means of rod or shaft 64. The rod extends through vertically oriented holes in the peak 66 and cross member 62 to provide a vertical bearing around which the wing rotates.

The wing 30 is rotatable between a right deflecting position and a left deflecting position. Angle iron extensions 52 and 54, respectively, are attached to the rear of side surfaces 42 and 44 and extend outwardly therefrom. When the wing is in its right deflecting position, as shown in FIGURES 1, 2, 3, 4 and 6, the lower edge of the left arm 40 is adjacent the left edge 76 of the main surface 27 and the lower edge of the right arm 38 abuts against the extension 52. Likewise, when the wing is in its left diverting position, as shown in FIGURE 5, the bottom of the arm 38 is adjacent the right edge 74 of the main surface 27 and the bottom edge of the left arm 40 abuts against the extension 54.

The wing is rotated between these two positions by the use of ropes 58 and 60. As best shown in FIGURE 5, rope 58 is attached to the rear surface of arm 38 near the outside edge thereof. It runs through pulley 70 mounted on extension 52, is guided under the outer edge of side surface 42, runs to the front end of conveyor 12 and hangs down into the mow. Likewise, as shown in FIGURE 6, rope 60 is attached to the rear surface of arm 40 near the outside edge thereof. It runs through pulley 72 mounted on extension 54, is guided under the outer edge of side surface 44, runs to the front end of the conveyor 12 and also hangs into the mow. Thus a person working in the mow can shift the wing 30 from one position to the other by pulling one of the ropes 58 or 60 thereby rotating the wing until one arm comes into contact with one of the extensions 52 or 54.

Rope 56 is tied to the end of extension 52 and runs rearwardly to the end of conveyor 12, through pulley 68, forward to the front of the conveyor and down into the mow. By pulling on rope 56, the diverter may be moved along side rails 36 toward the rear of conveyor 12. Likewise, by pulling on both ropes 58 and 60, the diverter may be moved toward the front end of conveyor 12.

In operation, the wing 30 is secured in one deflecting position by use of the described ropes and bales are placed on the guide bars 34 of conveyor 10. The bales are engaged on hooks 24 of chain 18 and are conveyed up conveyor 10 and onto conveyor 12. There the bales are likewise conveyed along bars 34 until they come to the diverter 26.

The moving bales slide up the continuations 29 which straddle bars 34, move up front surface 28, and off of the conveyor chain hooks 24. As a bale moves up the front surface 28, it comes into contact with the arm of wing 30 which is secured in position adjacent to one edge of the main surface 27. This arm is in the path of the bale and impedes the movement of the bale up one side of the diverter. The arm deflects it toward the opposite side of the deflector so that, as the bale is deflected, it moves across the intersection of the two faces 38 and 40 and falls under the influence of gravity away from the side of the diverter opposite the deflecting arm.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. In a bale distributing system utilizing a conveyor, a bale deflector movably mounted on the conveyor, comprising a front surface and two side surfaces, all of which surfaces slope upwardly relative to the conveyor and intersect at a point above the conveyor; a V-shaped wing mounted at the point on a vertical shaft by means of a vertical bearing; the wing having two essentially planar surfaces diverging and sloping rearwardly from the front surface; said wing being rotatable about said bearing between two deflecting positions; each of the positions being characterized by one wing surface being adjacent an intersection of the front surface and one side surface and extending toward the front of the deflector whereby bales carried by the conveyor ride up the front surface, are deflected by the one wing surface toward the opposite side of the front surface, over said one side surface and fall away from the deflector on the side opposite said one wing surface; and a rope control system for moving the deflector along the conveyor and for rotating the wing from one deflecting position to the other deflecting position.

2. In a bale distributing system utilizing a conveyor, a bale deflector movably mounted on the conveyor comprising a front surface and two side surfaces, all of which surfaces slope upwardly and inwardly relative to the conveyor and intersect above the conveyor; a two armed wing rotatably mounted about a vertical axis at the intersection, the wing sloping upwardly and rearwardly from the front surface and being rotatable about said axis between two deflecting positions; each of the positions being characterized by one arm being adjacent an intersection of the front and one side surface and extending toward the front of the deflector surface whereby bales carried by the conveyor ride up the front surface, are deflected by the one arm toward the opposite side of the deflector and fall away therefrom; and a rope control system for moving the deflector along the conveyor and for rotating the wing from one deflecting position to the other deflecting position.

3. In a bale distributing system utilizing a conveyor, a bale deflector mounted adjacent the conveyor comprising a front surface sloping upwardly and rearwardly relative to the deflector; a two armed wing located at the top of the surface, sloping rearwardly therefrom and being rotatable about a vertical axis between two deflecting positions; each of the positions characterized by one arm of said wing being rotated about said axis to a position adjacent one side of the front surface and extending forwardly toward the front of the deflector whereby bales carried by the conveyor ride up the surface, are deflected by the one arm toward the side of the deflector opposite said arm and fall away therefrom; and means for moving the deflector along the conveyor and for shifting the wing from one deflecting position to the other deflecting position.

4. In a bale distributing system utilizing a conveyor, a bale deflector mounted adjacent the conveyor comprising a front surface sloping upwardly and rearwardly relative to the deflector; a deflecting plate mounted at the top of the surface; the plate being movable between two deflecting positions; each of the positions being characterized by one edge of the plate being adjacent one side of the surface whereby bales carried by the conveyor ride up the surface, are deflected by the plate toward the opposite side of the surface and fall away therefrom.

5. In a bale distributing system a bale deflector located in the path of movement of the bales comprising a front surface sloping upwardly and rearwardly from the deflector; a single deflecting plate moveably mounted at the top of the surface; the plate being shiftable between two deflecting positions at either side of the top of the surface whereby bales ride up the surface, are deflected by the plate to the opposite side of the deflector and fall away therefrom; and means for moving the deflector along the path and for shifting the plate from one position to the other position.

6. In a bale distributing system a bale deflector located in the path of movement of the bales and comprising a front surface sloping upwardly in the direction of movement of the bales; a single deflecting plate mounted on the surface; the plate being shifting between two deflecting positions each such position being adjacent a different side of the surface whereby bales ride up along the surface, are deflected by the plate to the side of the deflector opposite the plate and fall away therefrom.

References Cited in the file of this patent

UNITED STATES PATENTS

| | | |
|---|---|---|
| 2,699,249 | Milliken | Jan. 11, 1955 |
| 2,990,053 | Lance | June 27, 1961 |